(12) United States Patent
Chang

(10) Patent No.: US 6,536,808 B1
(45) Date of Patent: Mar. 25, 2003

(54) SOFT TUBE COUPLING WITH EXPANDING INTERNAL SLEEVE

(76) Inventor: Mao Kun Chang, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/016,379

(22) Filed: Dec. 17, 2001

(51) Int. Cl.[7] .................................................. F16L 33/20
(52) U.S. Cl. ...................... 285/256; 285/258; 285/382.4
(58) Field of Search ................................. 285/256, 258, 285/382.4, 382.5

(56) References Cited

U.S. PATENT DOCUMENTS

| | | | | | |
|---|---|---|---|---|---|
| 228,161 A | * | 6/1880 | Adlam | .................... | 285/258 |
| 1,181,856 A | * | 5/1916 | Downer | .................... | 285/214 |
| 1,890,290 A | * | 12/1932 | Hargreaves | ................ | 285/258 |
| 2,071,478 A | * | 7/1937 | Wick | .................... | 285/258 |
| 2,485,049 A | * | 10/1949 | Hallisy | .................... | 285/222.5 |
| 2,916,816 A | * | 12/1959 | Black et al. | ................ | 285/258 |
| 3,211,476 A | * | 10/1965 | Wagner | .................... | 285/258 |
| 4,212,487 A | * | 7/1980 | Jones et al. | ................ | 285/243 |
| 4,773,678 A | * | 9/1988 | Canaud et al. | ............ | 285/253 |
| 5,050,912 A | * | 9/1991 | Hayasaka | ................ | 285/214 |
| 5,967,568 A | * | 10/1999 | Bird | .................... | 285/258 |

\* cited by examiner

Primary Examiner—Eric K. Nicholson

(57) ABSTRACT

A joint of a soft tube comprises a tube joint, an inner sleeve, and an outer sleeve. The inner sleeve is inserted into the soft tube and then the soft tube is inserted into the outer sleeve; then the connecting end of the tube joint is inserted into the soft tube. Next, by a hand tool clamping the actuating ring to rotate the tube joint, the connecting end of the tube joint is screwed into the inner threaded hole of the inner sleeve. The connecting end will cause the section of the inner sleeve having slots to expand outwards. As a result, the corresponding wall of the soft tube will expand and thereby deform so as to tightly resist against the enlarged end of the outer sleeve. Thereby, radial and axially connecting forces are formed, the soft tube can be firmly and tightly secured to the tube joint.

6 Claims, 7 Drawing Sheets

SOFT TUBE COUPLING WITH EXPANDING INTERNAL SLEEVE

FIELD OF THE INVENTION

The present invention relates to joint structures of soft tubes, and particularly to a joint which can be firmly secured to a soft tube.

BACKGROUND OF THE INVENTION

Referring to FIGS. 1 and 2, a prior tube joint 10 for being connected to a soft tube 12 for transferring gas or liquid is illustrated. One end of the tube joint 10 is installed with a connecting end 11 for being engaged with the soft tube 12. Then, a ring 13 encloses the soft tube 12 near one opening of the soft tube. By a stud 14 and a nut 15, the ring 13 causes the soft tube 12 to be tightly engaged with the connecting end 11. Thereby, the soft tube 12 is connected with the tube joint 10. However, in this prior design, only a ring 13 is used to connect the soft tube 12 with the connecting end 11 of the tube joint 10 from the outer side. Therefore, the connection of the soft tube 12 and the tube joint 10 easily disengages due to the looseness of the stud 14 and the nut 15 or because the soft tube 12 hardens or deforms. Moreover, when the soft tube 12 is used to transfer high pressure gas or liquid, it is possible that the gas or liquid will jet out or leak out due to weak clamping force of the ring 13. If the transferred gas or liquid is burnable or poisonous, a serious accident will occur.

SUMMARY OF THE INVENTION

Accordingly, the primary object of the present invention is to provide a joint of a soft tube which can be firmly secured to a soft tube.

To achieve the object, the present invention provide a joint of a soft tube comprising a tube joint, an inner sleeve, and an outer sleeve. The inner sleeve is inserted into the soft tube and then the soft tube is inserted into the outer sleeve; then the connecting end of the tube joint is inserted into the soft tube. Next, by a hand tool clamping the actuating ring to rotate the tube joint, the connecting end of the tube joint is screwed into the inner threaded hole of the inner sleeve. The connecting end will cause the section of the inner sleeve having slots to expand outwards. As a result, the corresponding wall of the soft tube will expand and thereby deformed so as to tightly resist against the enlarged end of the outer sleeve. Thereby, radial and axially connecting forces are formed, the soft tube can be firmly and tightly secured to the tube joint.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
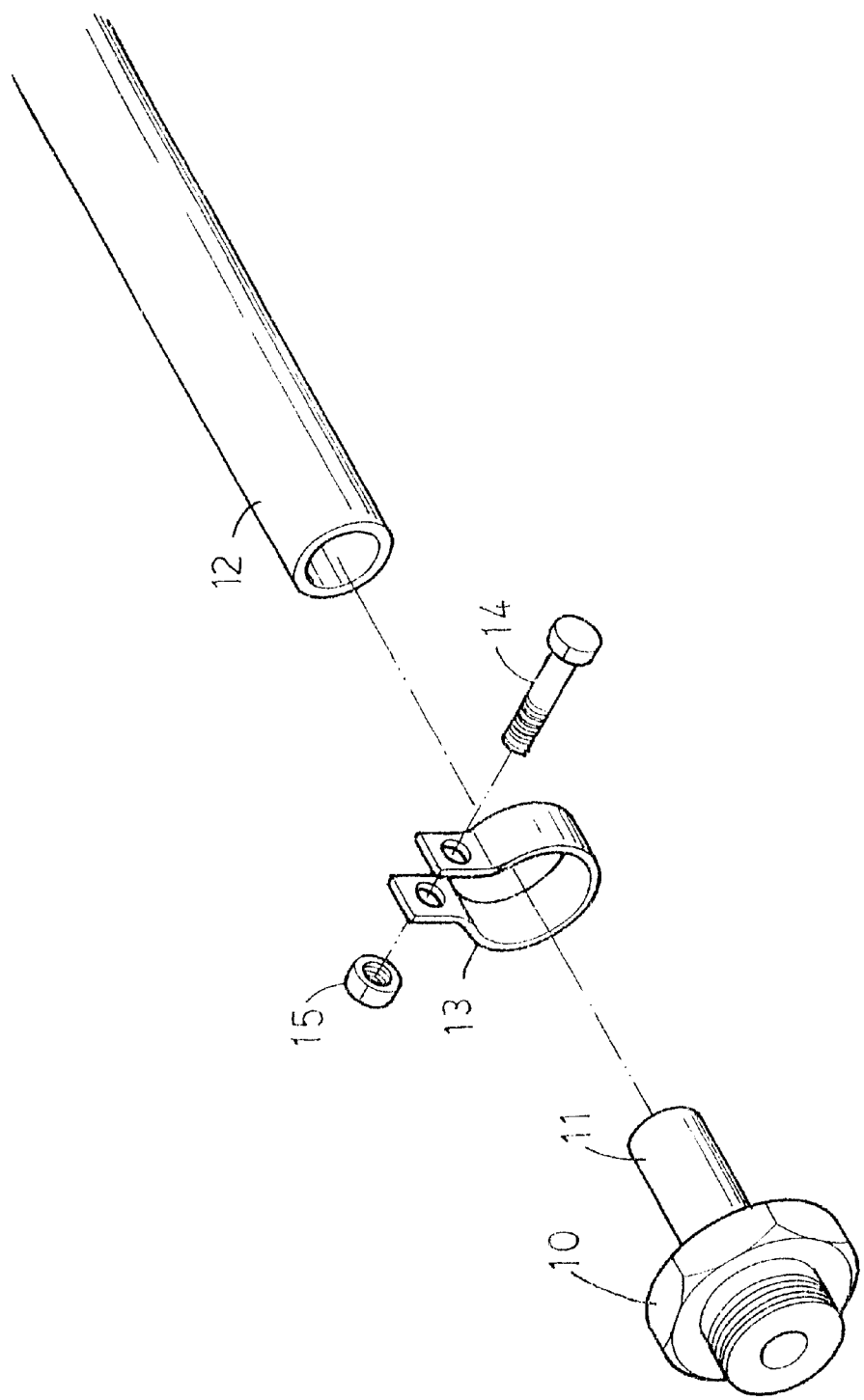
FIG. 1 is an exploded perspective view of a prior art joint of a soft tube.
Figure 2:
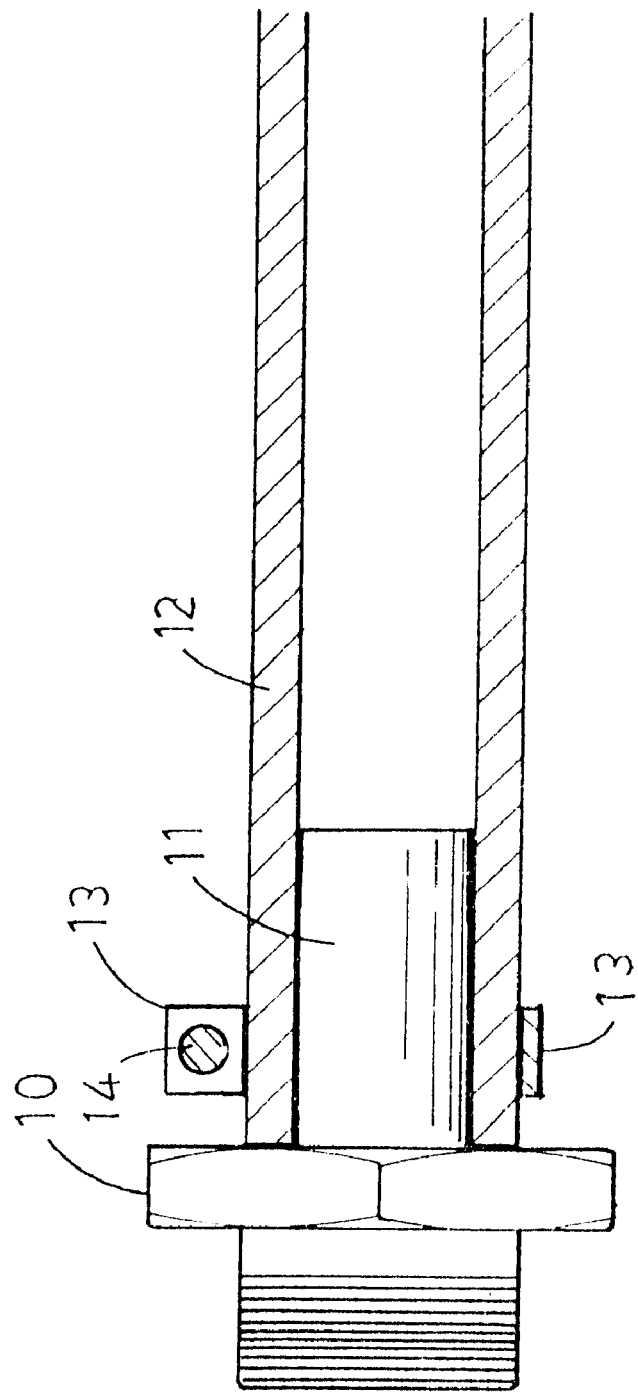
FIG. 2 is a cross sectional view of a prior joint of a soft tube.
Figure 3:
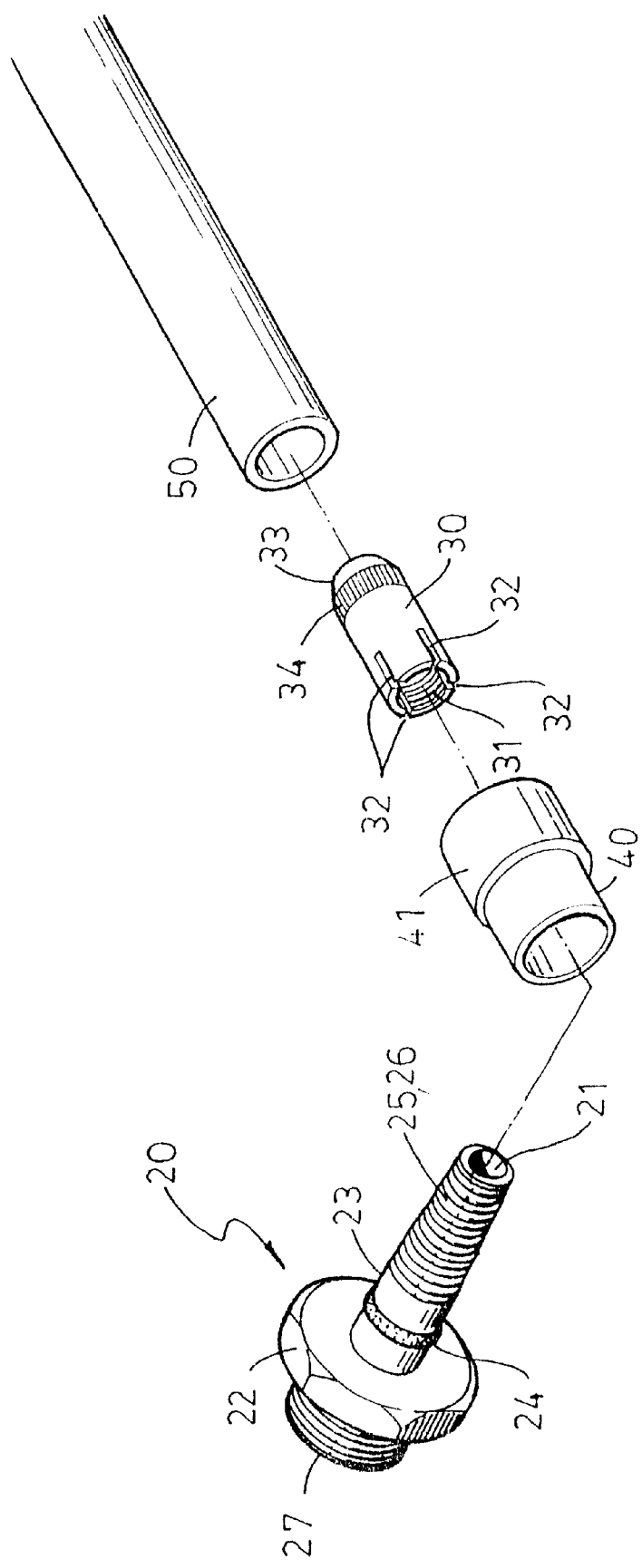
FIG. 3 is an exploded view of the present invention.

Referring to FIG. 3, the present invention is formed by a tube joint 20, an inner sleeve 30, and an outer sleeve 40.

The center of the tube joint 20 (referring to FIGS. 3 and 4) is installed with a penetrating channel 21. An actuating ring 22 is formed on the tube joint 20. One side of the actuating ring 22 is installed with a connecting end 23 for being engaged with a soft tube 50. An outer surface of the connecting end 23 is formed with a tapered surface 25 with diameters reduced from the inner side to the outer side. The tapered surface 25 is formed with outer thread 26. A drain-proof washer 24 is mounted around the outer periphery of the connecting end 23. Another side of the actuating ring 22 is installed with a screwed end 27 for being locked with an opening of a control valve 60 (or the inlet or outlet of gas or liquid of other means), as shown in FIG. 5.

The center of the inner sleeve 30 (referring to FIGS. 3 and 4) is formed with a penetrating inner threaded hole 31. The inner threaded hole 31 is exactly engaged with the connecting end 23 of the tube joint 20. One end of the inner sleeve 30 is formed with a plurality of slots 32, and another end thereof is formed with a tapered portion 33. The outer wall of the inner sleeve 30 near the tapered portion is formed with stopping textures 34.

Figure 4:
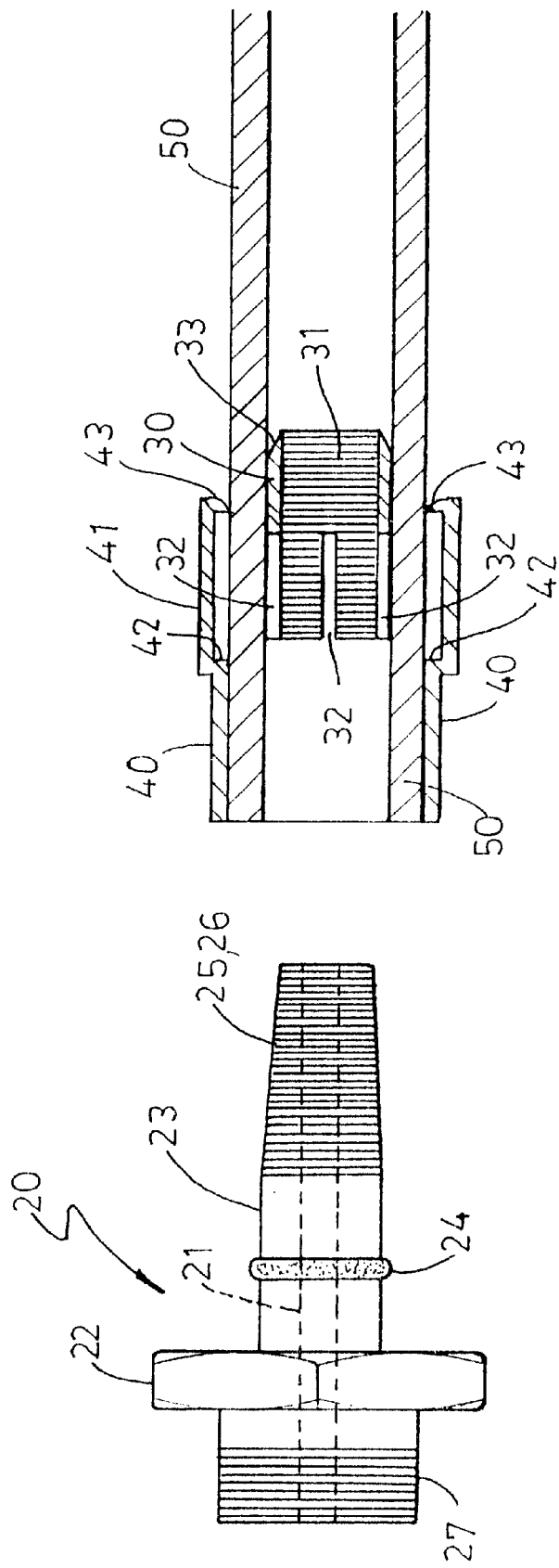
FIG. 4 is a plane cross sectional view of the present invention before being assembled.

The outer sleeve 40 is a hollow sleeve (referring to FIGS. 3 and 4). The inner diameter of one end of the outer sleeve 40 is approximately equal to the outer diameter of the soft tube 50. Therefore, the outer sleeve 40 exactly encloses the soft tube 50. Another end of the outer sleeve 40 is formed with an enlarged end 41 which has a larger inner diameter. A connecting wall 42 is formed between the enlarged end 41 and the other portion of the outer sleeve 40. The inner edge of the opening of the enlarged end 41 is formed with a circular lip portion 43.

Figure 5:
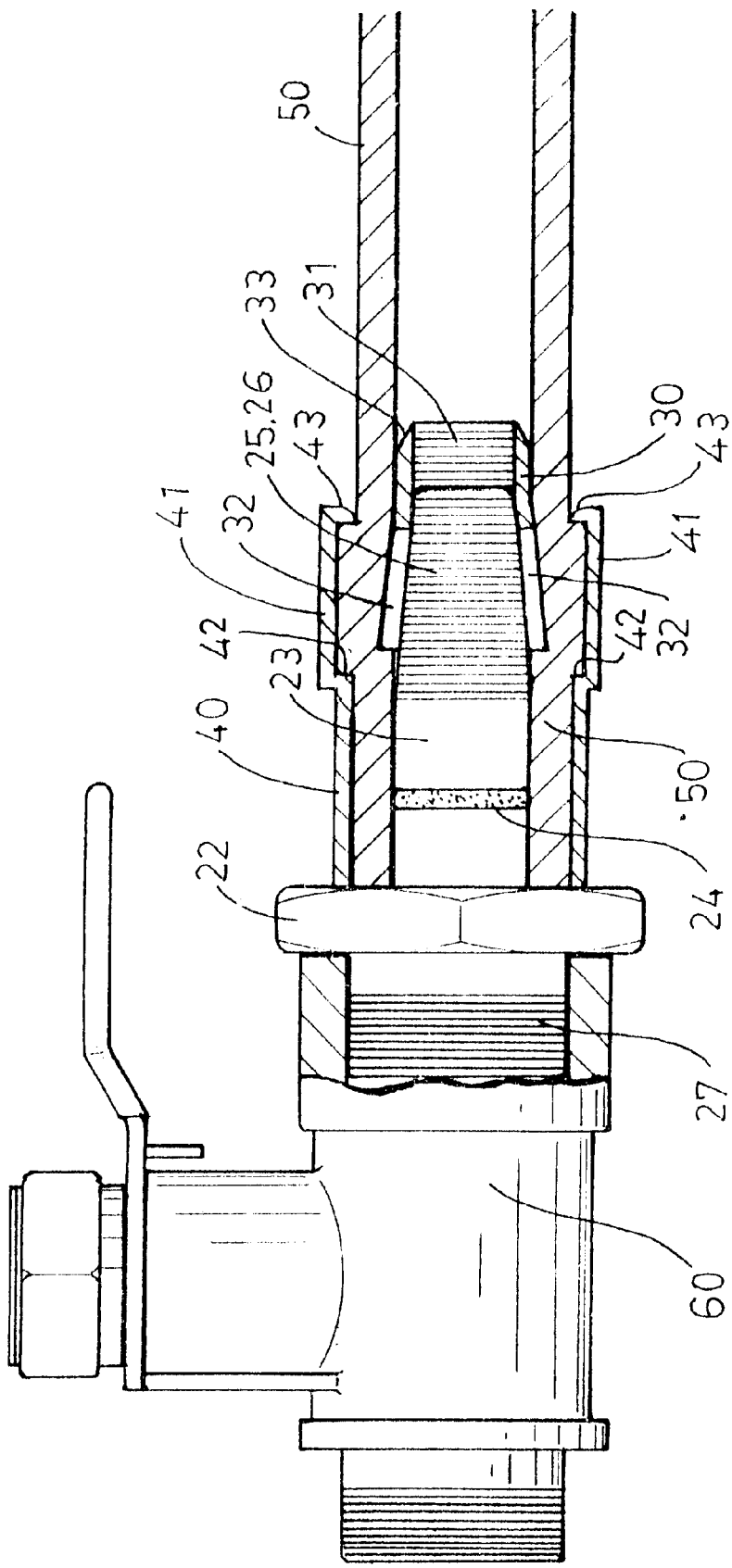
FIG. 5 is a plane cross sectional view of the present invention after being assembled.

Referring to FIGS. 4 and 5, by above mentioned elements, the inner sleeve 30 can be inserted into the soft tube 50 and then the soft tube 50 is inserted into the outer sleeve 40. Then the connecting end 23 of the tube joint 20 is inserted into the soft tube 50. Next, by a hand tool (such as a spanner or pliers, etc.) to clamp the actuating ring 22 and then rotate the tube joint 20, the connecting end 23 of the tube joint 20 is screwed into the inner threaded hole 31 of the inner sleeve 30. Since the outer wall of the inner sleeve 30 has stopping textures 34, the inner sleeve 30 will not rotate. When the tube joint 20 further rotates, the tapered surface 25 of the connecting end 23 will cause the section of the inner sleeve 30 having slots 32 to expand outwards. As a result, the corresponding wall of the soft tube 50 will expand and thereby deformed so as to tightly resist against the enlarged end 41 of the outer sleeve 40. Thereby, a radial connecting force is formed. By the bending wall 42 between the outer sleeve 40 and the enlarged end 41, the inner and outer walls of the soft tube 50 corresponding to the bending wall 42 will be extruded and thus deform so as to have a sawteeth-like shape. An axial connecting force is generated. With the drain-proof washer 24 installed on the connecting end 23, the soft tube 50 can be firmly and tightly secured to the tube joint 20.

Figure 6:
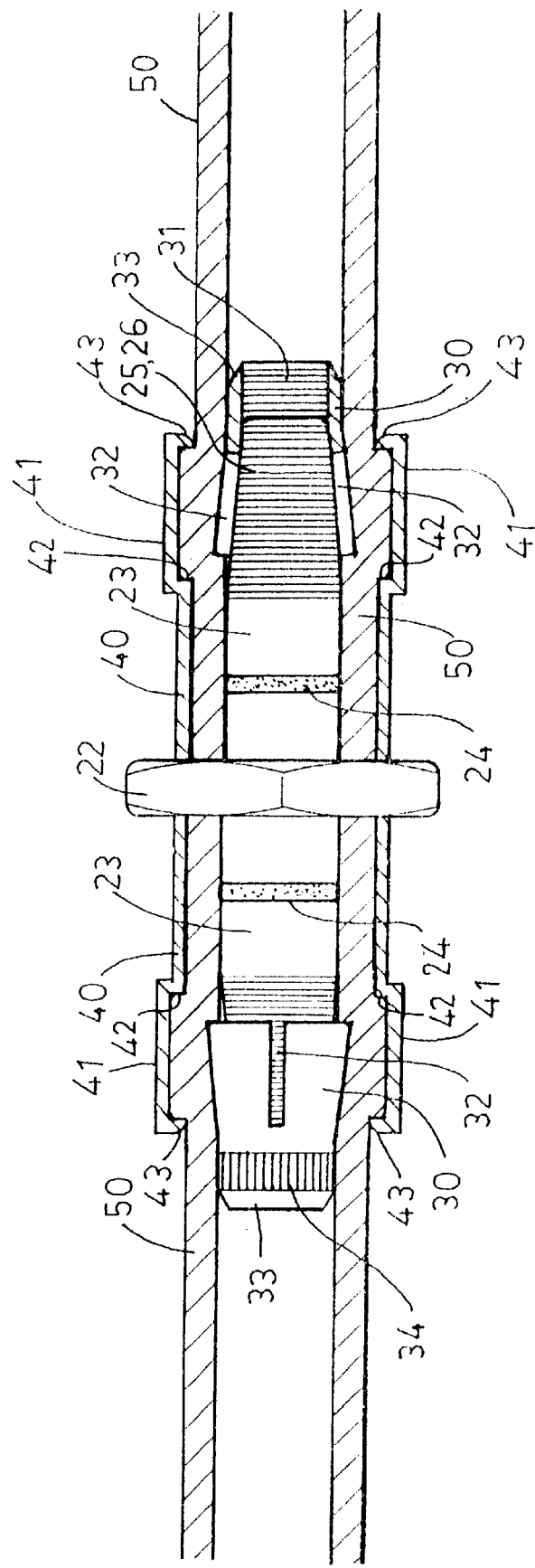
FIG. 6 is a schematic view showing another embodiment of the tube joint of the present invention.

Referring to FIG. 6, in the present invention, the left and right sides of the tube joint 20 of the present invention can be formed with connecting ends 23 for being engaged with the soft tube 50. Thereby, two soft tubes 50 are connected with one another.

Figure 7:
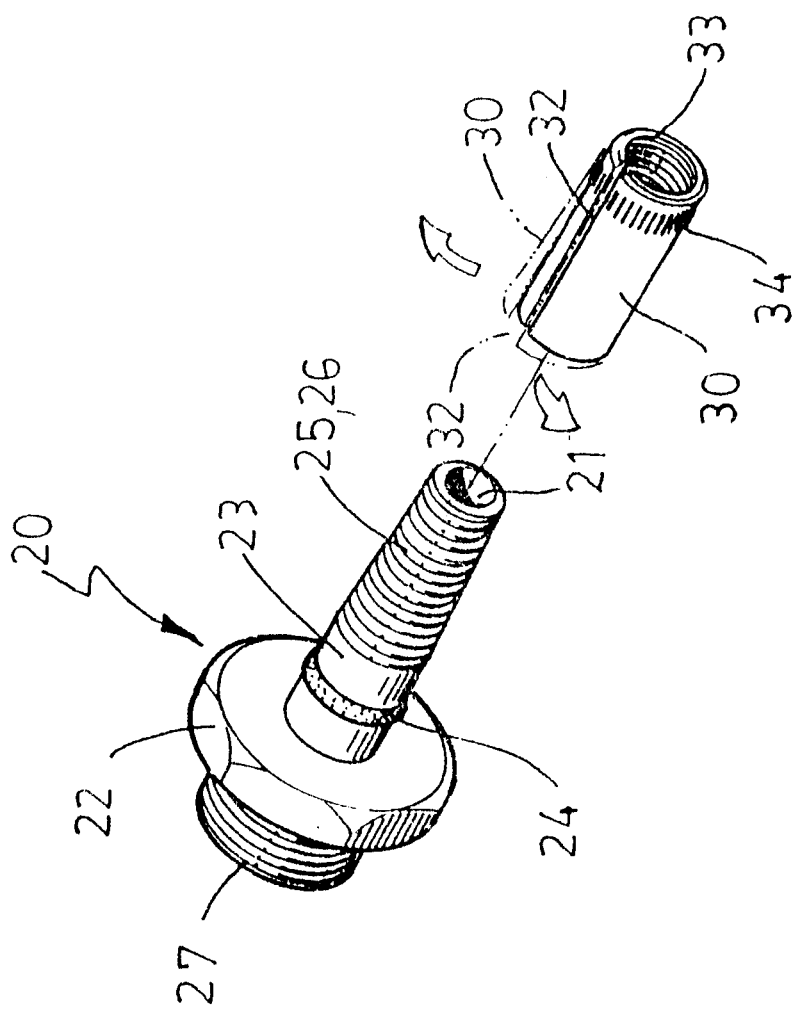
FIG. 7 is a schematic view showing another embodiment of the inner sleeve of the present invention.

With reference to FIG. 7, in the present invention, the inner sleeve 30 has only one slot 32 which extends from one end to another end.

It is known from above description and drawings that in the present invention, by the assembly of the tube joint 20, inner sleeve 30, and outer sleeve 40; the tube joint 20 and soft tube 50 can be firmly connected in radial and axial directions.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A joint of a soft tube comprising a tube joint, an inner sleeve, and an outer sleeve; wherein a center of the tube joint is formed with a penetrating channel; an actuating ring is formed on the tube joint; one side of the tube joint is formed as a connecting end which is adjacent the actuating ring and for being engaged with a soft tube; an outer surface of the connecting end is formed as a tapered surface with diameters reduced from a side near the actuating ring to another side; the tapered surface is formed with outer threads;

a center of the inner sleeve is formed with a penetrating inner threaded hole; the connecting end of the tube joint is screwed into the inner threaded hole; one end of the inner sleeve is formed with a plurality of slots; and the outer sleeve is a hollow sleeve; an inner diameter of one end of the outer sleeve is approximately equal to the outer diameter of the soft tube; therefore, the outer sleeve exactly encloses the soft tube; another end of the outer sleeve is formed with an enlarged end with a larger inner diameter; a connecting wall is formed between the enlarged end and the other portion of the outer sleeve;

wherein, the inner sleeve is inserted into the soft tube and then the soft tube is inserted into the outer sleeve; then the connecting end of the tube joint is inserted into the soft tube; next, by a hand tool clamping the actuating ring so as to rotate the tube joint, the connecting end of the tube joint is screwed into the inner threaded hole of the inner sleeve; the connecting end will cause a section of the inner sleeve having slots to expand outwards; as a result, a corresponding wall of the soft tube will expand and thereby deform so as to tightly resist against the enlarged end of the outer sleeve; thereby, radial and axially connecting forces are formed, and thus the soft tube is firmly and tightly secured to the tube joint.

2. The joint of a soft tube as claimed in claim 1, wherein a drain-proof washer is mounted around an outer peripheral wall of the connecting end near the actuating ring.

3. The joint of a soft tube as claimed in claim 1, wherein an outer wall of the inner sleeve near the tapered portion is formed with textures.

4. The joint of a soft tube as claimed in claim 1, wherein an inner edge of an opening of the enlarged end is formed with a circular lip portion.

5. The joint of a soft tube as claimed in claim 1, wherein opposite ends of the tube joint is be formed with connecting ends for being engaged with the soft tube.

6. The joint of a soft tube as claimed in claim 1, wherein the inner sleeve has only one slot which extends from one end of the inner sleeve to another end thereof.

* * * * *